W. H. KENNEDY.
TRAP.
APPLICATION FILED NOV. 12, 1910.
986,010.
Patented Mar. 7, 1911.
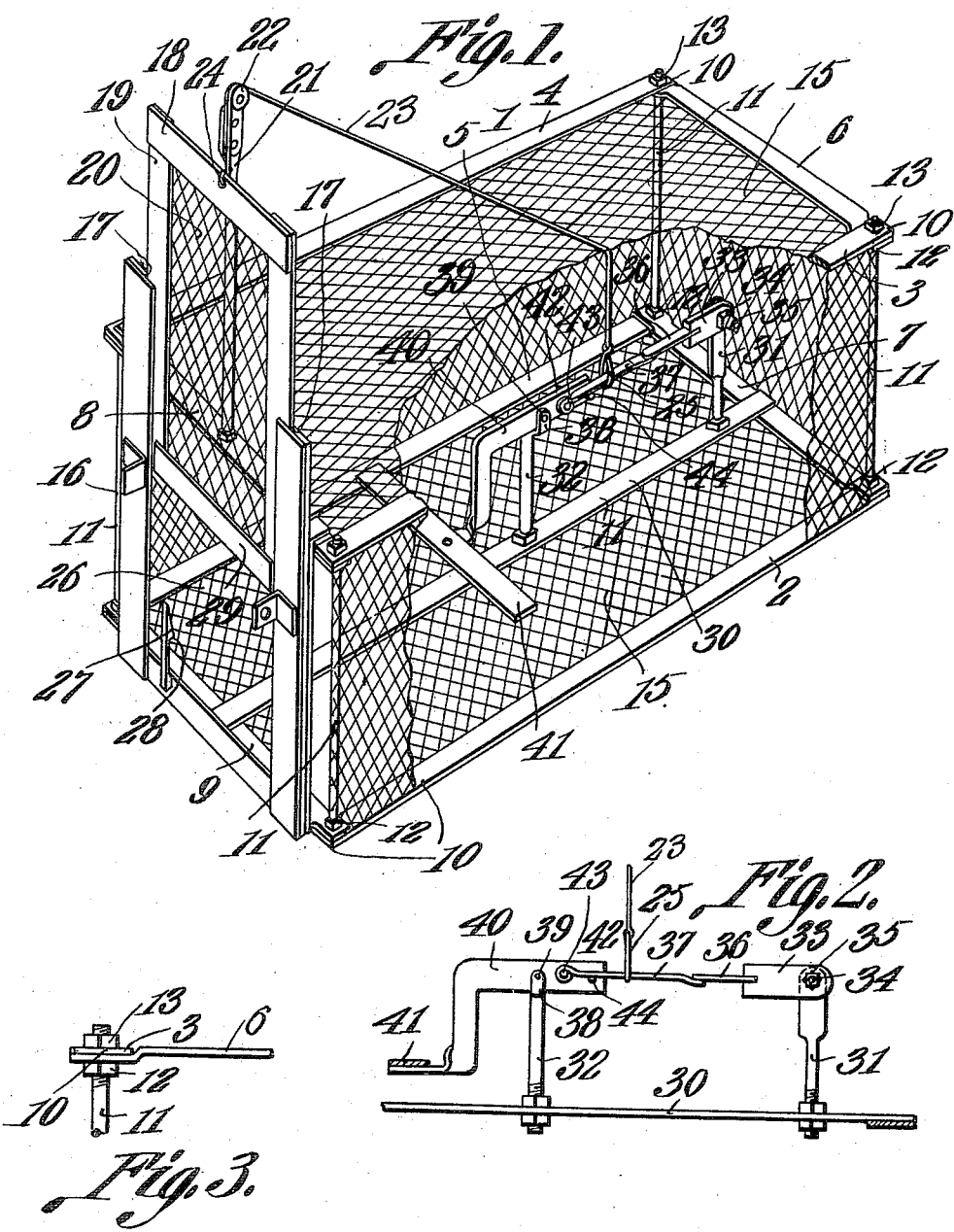
Witnesses
William H. Kennedy
Inventor
by C. A. Snow & Co.
Attorneys

UNITED STATES PATENT OFFICE.

WILLIAM H. KENNEDY, OF NAPLES, TEXAS.

TRAP.

986,010.

Specification of Letters Patent.   Patented Mar. 7, 1911.

Application filed November 12, 1910.   Serial No. 592,118.

*To all whom it may concern:*

Be it known that I, WILLIAM H. KENNEDY, a citizen of the United States, residing at Naples, in the county of Morris and State of Texas, have invented a new and useful Trap, of which the following is a specification.

This invention relates to a new and useful animal trap, and the invention aims as its primary object to provide novel means, which may be actuated by the animal, after having entered the trap, for throwing the gate.

In the drawings,—Figure 1 is a view in perspective of an animal trap, embodying the invention. Fig. 2 is a detailed view in elevation of the trigger and detent in set position. Fig. 3 is a detail view of one of the corner portions of the frame of the trap.

Attention is directed to the accompanying drawings, in which the preferred form of the invention is disclosed; 1 denotes the frame of the trap, which may be of any desired shape, but in the present instance is shown as being rectangular in contour. This frame comprises corner bars 2, 3, 4, 5, 6, 7, 8 and 9. The corner bars 2, 3, 4 and 5 are connected to the off set ends of the corner bars 6, 7, 8 and 9, as shown at 10, and connected together by the rods 11. The end portions of the rods are provided with the nuts 12, against which the bars 6, 7, 8, and 9 abut. Against the bars 2, 3, 4, and 5 the nuts 13 bear, thus clamping the connected ends of the bars 2, 3, 4, 5, 6, 7, 8 and 9 together, as shown clearly in Fig. 1. By this construction a strong frame for an animal trap, is provided. Connected to this rectangular frame are sheets of wire mesh work 15, in order to afford an open work inclosure. The end 16 of the trap is provided with the guide-ways 17, in which the door 17 is mounted. The door consists of a rectangular frame 19 having a wire screen 20 stretched thereacross.

Projecting upwardly from the end 16 of the trap, and from the bar 8, is a post 21, on the upper end of which a roller member or pulley 22 is mounted, and over which the cable or cord 23 is engaged. This cable 23 is connected to the door as at 24, while its other end is formed with a loop 25, the function of which will presently appear. The lower portion of the door opening 26 has projecting upwardly therefrom a spring catch 27 having a shoulder 28, adapted to engage the bar 29 of the said door, for instance when the door has been sprung.

Extending longitudinally and centrally of the trap is a bar 30. Projecting upwardly from this bar 30 are the posts 31 and 32. Projecting laterally from the post 31 is an arm 33, which is secured to the post 31 by means of a bolt and nut 34 and a lock nut 35. This arm 33 is provided with a leaf spring 36, to be engaged by the leaf spring 37. The post 32 is formed with an upper bifurcated end 38, in which is fulcrumed upon a pin 39, an angular trigger member 40, which includes a transverse pressure bar 41. The spring member 37 is pivoted to the horizontal portion 42 of the trigger member as shown at 43, and engages over the pin or lug 44, with its extremity arranged under the spring member 36. The loop 25 of the cable 23 receives the spring member 37, prior to its being arranged under the spring member 36. In Fig. 1, however it will be clearly manifest that the trap is set, in order to be sprung by the animal after having entered the trap. To spring the trap the animal passes through the door opening until he reaches the bait upon the horizontally disposed bar 41 of the trigger member 40. After he has reached the bait and is in the act of tampering with it, he will apply too much pressure upon the trigger member, and by so doing he will cause the spring member 37 to snap from under the spring member 36. When this occurs the loop 25 leaves the spring member 37, thereby permitting the door to close by its own weight.

The invention having been set forth, what is claimed as new and useful is:—

1. In an animal trap, a frame supporting a mesh-work inclosure, and embodying a gravitating door; said mesh-work inclosure having a rigid element therein including a spring member projecting therefrom; a vertical post having a pivoted angular trigger provided with a rearwardly projecting spring to engage under the first named spring member, said door having a flexible element passing over a pulley arranged above the mesh-work inclosure, said flexible element being adapted to extend through the mesh-work inclosure and being provided with a loop at its extremity to engage the second named spring.

2. The combination of an inclosure having a pulley arranged thereabove, and including a door provided with a flexible element adapted to pass over said pulley and into the inclosure, said flexible element having a loop at its extremity; of a trigger mechanism comprising a pair of stationary posts, one having a rigid arm terminating in a spring member; while upon the other, an angular trigger member is pivoted; said trigger member including a transverse pressure bar and a pivoted spring member to pass through said loop and designed to be engaged under the first named spring member, said trigger member having means to be engaged by the second named spring member to cause said second named spring member to be held rigidly projecting from the trigger member.

3. The combination of an inclosure having a pulley arranged thereabove, and including a door provided with a flexible element adapted to pass over said pulley and into the inclosure, said flexible element having a loop at its extremity; of a trigger mechanism comprising a pair of stationary posts, one having a rigid arm terminating in a spring member; while the other an angular trigger member pivoted therein; said trigger member including a transverse pressure bar and a pivoted spring member to pass through said loop and designed to be engaged under the first named spring member; said trigger member having a laterally extending pin arranged beneath the second named spring member, serving as a stop therefor; and means for holding the door closed, after the trigger member is sprung.

In testimony that I claim the foregoing as my own, I have hereto affixed my signature in the presence of two witnesses.

WILLIAM H. KENNEDY.

Witnesses:
C. D. HIBBETTS,
J. W. TREADWELL.

---

Copies of this patent may be obtained for five cents each, by addressing the "Commissioner of Patents, Washington, D. C."